United States Patent Office 3,388,046
Patented June 11, 1968

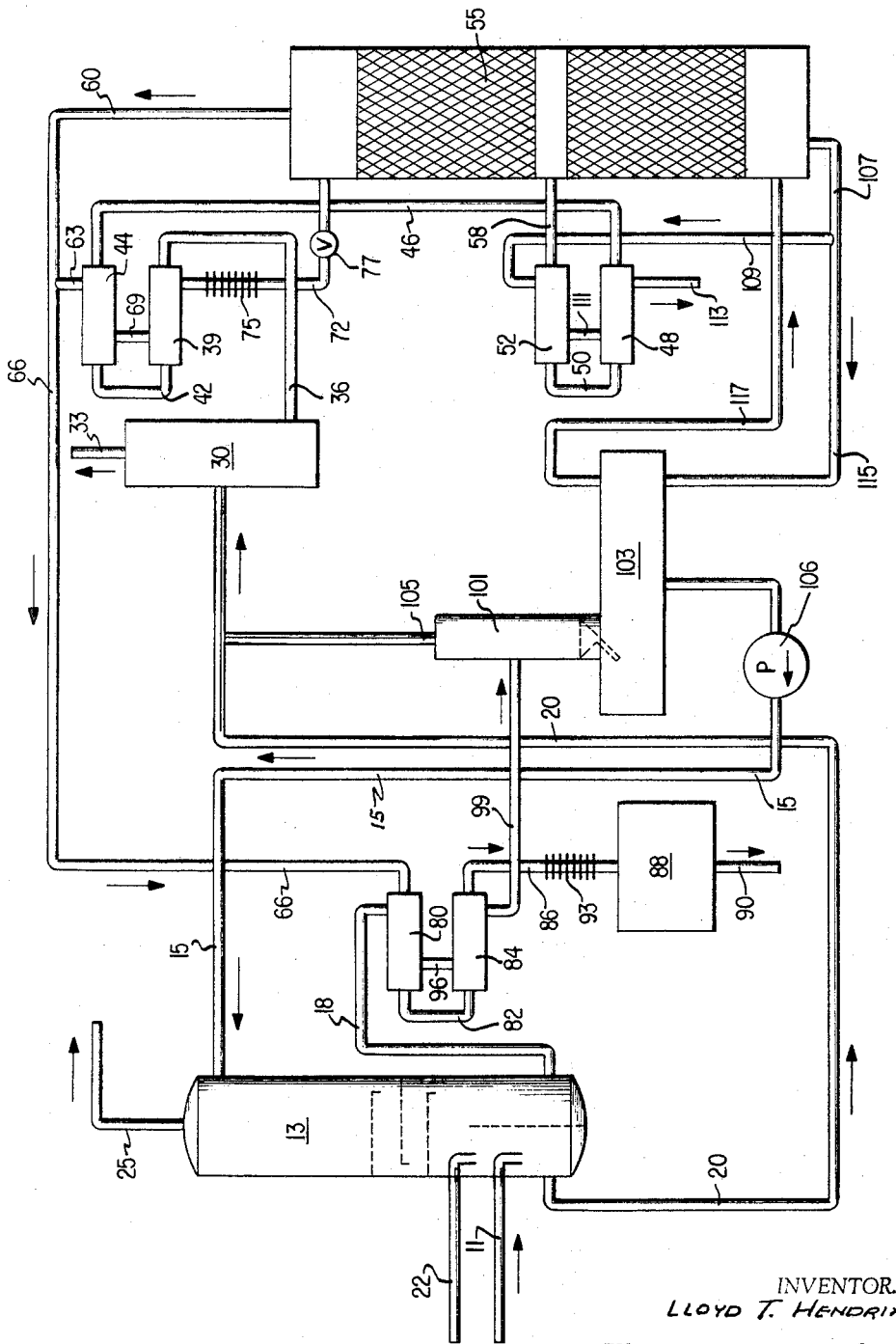

3,388,046
SEPARATION OF METHANOL, WATER AND GLYCOL BY PLURAL DISTILLATION UTILIZING HEAT RECOVERY
Lloyd T. Hendrix, Santa Ana, Calif., assignor to Atlantic Richfield Company, a corporation of Pennsylvania
Filed Feb. 17, 1965, Ser. No. 433,385
11 Claims. (Cl. 203—18)

ABSTRACT OF THE DISCLOSURE

This invention involves a method for separating a lower-boiling component such as methanol from a mixture of said component with an intermediate-boiling component such as water, and hydrocarbons by contacting the mixture with a higher-boiling absorbent liquid component such as glycol in an absorption contactor vessel, and subsequently fractionally distilling the mixture of the absorbent and the absorbed materials in a first fractionator. The liquid lower-boiling component and intermediate-boiling component from the absorption contactor vessel is then joined with the lower-boiling component and intermediate-boiling component vapors from the first fractionator and fractionally distilled in a second fractionator to recover the lower-boiling component as an overhead stream which is split into a products stream and a reflux stream. The products stream is used to preheat the mixture of the absorbent with the absorbed materials prior to the first fractionation, and the reflux stream is used to preheat the material fed to the second fractional distillation unit.

This invention pertains to a novel method for separating a fluid mixture comprising a plurality of individual fluids differing from each other in boiling point, and in particular is concerned with the conservation of heat values in the distillation separation of two fluids where a third fluid higher boiling than the first two fluids may also be involved. The method of this invention is of particular value in the distillation of methanol from its mixture with water, especially where this mixture had been formerly contained in a three-component mixture with ethylene glycol.

Copending application Ser. No. 293,482 filed July 8, 1963, now U.S. Patent No. 3,213,593, discloses a method for recovery of methanol from its mixture with water and hydrocarbons. Such mixture can result where methanol is used in the recovery of hydrocarbons from an oil well; for example, where methanol is used as an antifreeze, to prevent hydrate formation. Some of the water-alchol mixture will readily separate from the hydrocarbons because of inherent immiscibility charatceristics, but completely methanol recovery often may require contact with liquid ethylene glycol in a liquid-liquid contact apparatus. The effluent product materials from this contacting stage comprise hydrocarbons, a solution of methanol in water, and glycol containing some water and methanol. The hydrocarbon can be gases of about 1–3 carbon atoms and light liquid hydrocarbons, say of about 3–5 carbon atoms, usually mixtures of these hydrocarbons.

The water and methanol may be removed from the glycol as a vapor mixture from a glycol regeneration zone and the combined vapor mixture and methanol-water liquid solution are sent to a fractionator for resolution of the mixture. Some of the separated methanol is condensed and returned as reflux to the fractionator while another portion is sent to storage or reuse. The separated water is generally sent directly to waste, although a portion of it may be heated or even converted to steam and returned to the fractionator to supply the energy for distillation.

In the present invention the methanol vapor taken from the fractionator is divided into two streams. One stream passes to storage or reuse. This "product" stream is condensed and/or its heat values are exploited by passing it in indirect heat exchange with the glycol mixture passing to the regeneration zone. The other methanol stream is used as reflux to the fractionator, the methanol being condensed, or at least cooled, by indirect contact with fractionator feed.

The water from the fractionator also may be split into two streams. The recycle water stream which is returned to the fractionator may be heated or converted to steam by indirect contact with glycol in the regeneration zone. The other stream of water, before being sent to waste is divested of heat values by indirect contact with feed mixture to the fractionator which preferably has been previously heated by indirect heat exchange with the reflux methanol, which usually results in condensation of the methanol.

While designed primarily for a methanol-water-glycol system, the process of this invention may be used for treating fluid mixtures of the type A–B–C where the letters represent fluids of progressively higher boiling points. The mixture of A and B is sent to fractionation usually after two heating stages. The first heating stage comprises indirect exchange with vaporized lower boiling component A and this usually serves to partially or completely condense vaporized component A for reflux to the fractionator. The second heating stage comprises indirect exchange with a bottoms stream of higher or intermediate boiling component B before this stream is removed from the system. The liquid mixture of A and B sent to fractionation is derived in part from a mixture of A, B and C which is heated by indirect contact with gaseous component A from the fractionator thereby condensing A. The A–B–C mixture passes to a regeneration zone wherein a vaporous mixture of A and B is removed from component C. This vaporous mixture of components A and B is often mixed with a liquid mixture of the same components, or other means may be employed to provide this mixture in a cooled, generally liquid state for condensation of the reflux stream of component A.

The heat exchangers employed in this invention preferably are of the pipe-in-pipe class, providing two pipe sections of larger cross-sectional diameter, each large section containing a pipe of smaller cross-sectional diameter. One fluid passes through the inside of smaller diameter pipe, generally countercurrent to the flow of liquid on the outside of this smaller pipe.

The invention will be better understood by reference to the accompanying drawing which presents a flow diagram of the process.

In the drawing, a mixture of hydrocarbons containing methanol and water is conducted by line 11 to contacting chamber 13 which is supplied with a stream of glycol from line 15. The internal configuration of the chamber 13 is such as to direct the glycol (component C) with its accumulation of methanol (component A) and water (component B) to the effluent line 18. A liquid mixture of water and methanol is disentrained from the hydrocarbon mixture entering from line 11 and leaves chamber 13 by line 20. Effluent liquid crude hydrocarbon is removed by line 22 and gaseous hydrocarbon leaves the top of the chamber by line 25.

The liquid A–B mixture is conducted by line 20 to flash drum 30. The A–B liquid in line 20 mixes with A–B vapor from line 105 of stripper 101 and cools the vapor as the mixture of A–B liquid and vapors from stripper 101 proceeds to flash drum 30. In flash drum 30 the remaining hydrocarbons in the liquid mixture may be removed through line 33 while the remaining A–B liquid mixture passes, or may be pumped, through line 36 to a series of heat exchanges. The A–B liquid mixture passes from line 36 through the inside tube of tube exchanger 39, through the connection 42 and the inside tube of exchanger 44, thence through line 46 to the inside tube of exchanger 48, connection 50 and the inside tube of exchanger 52. The liquid A–B mixture, generally raised by passage through the heat exchangers to a temperature above the boiling point of A but below the boiling point of B is conducted to fractionator 55 by line 58 which enters the fractionator preferably near its mid-point. For example, a mixture of methanol and water may be at a temperature of about 180° F. In the fractionator, which preferably is a packed column, vaporized component A passes upwardly, leaving by line 60, for instance at 170° F., and is split into the reflux stream in line 63 and a product stream in line 66. The reflux vapor stream is lowered in temperature and preferably condensed by passage through the outside tube of exchanger 44, connection 69, the outside tube of exchanger 39 and line 72 which may be provided with fins 75 for an additional cooling effect. Line 72 also may be supplied with valve 77 before return of component A (methanol) to the top of fractionator 55.

Line 66 conducts the product stream of A to storage or further use. Preferably the heat values of this vapor stream are recovered and the vapors condensed by heat exchange with the mixed A, B and C stream which leaves chamber 13 by line 18. Thus the product A stream passed through the inner tube of tube exchanger 80, connection 82, inner tube of exchanger 84 and line 86 to, for example, storage chamber 88 and line 90. The line 86 may be provided with heat radiating fins 93 to insure condensation of the vapors.

The A, B and C mixture, in turn, passes from line 18 through the outer tube of exchanger 80, connection 96, the outer tube of exchanger 84 and line 99 which leads to the stripper zone 101 of component C (glycol) regenerator 103. Regenerator 103 may be of the type disclosed in my copending application, Ser. No. 78,019 filed Dec. 23, 1960, now U.S. Patent No. 3,209,519. In this regenerator, component C is separated by vaporizing out components A and B, the vaporous mixture of which passes by line 105 to line 28, thus joining the two A–B mixture streams to the flash drum and fractionator. Component C (glycol) passes back to chamber 13 by line 15 after regeneration in 103. A pump 106 may be employed if desired.

Effluent liquid product B (e.g., water) leaves or may be pumped from the bottom of fractionator 55 through line 107. Part of this stream is used to warm the fractionator feed, passing by line 109 to the outer tube of upper exchanger 52, connection 111 and outer tube of exchanger 48. This stream at a temperature of say 180° F. then passes out of the system by line 113. The other stream of product B passes by line 115 in indirect heat exchange with the component C regenerator 103. It is therein warmed, for instance to about 215° F., and may often be vaporized and conducted back to the bottom of fractionator 55 by line 117.

Although my present invention has been described with a certain degree of particularity, the scope of the invention is not limited to the details set forth, but is of the full breadth of the appended claims.

I claim:

1. In a method for separating a first mixture of a lower-boiling component, an intermediate-boiling component and a higher-boiling component wherein a first fractional distillation separates said higher-boiling component from the other components of said first mixture and wherein a liquid second mixture of said lower-boiling and intermediate-boiling components is passed to a second fractional distillation, the steps which comprise dividing a vaporous stream of said lower-boiling component taken overhead from said second distillation into a reflux stream and a product stream, passing said reflux stream in indirect contact with said liquid second mixture to heat said mixture and passing said product stream in indirect contact with said first mixture to heat said first mixture.

2. The method of claim 1 in which the product stream is condensed by said contact.

3. The method of claim 1 in which the reflux stream is condensed by said contact.

4. The method of claim 1 in which the lower-boiling component is methanol, the intermediate-boiling component is water and the higher-boiling component is glycol.

5. The method of claim 1 in which a stream of said intermediate-boiling component taken as a bottoms stream from said second distillation is also divided into a recycle stream and a product stream, and said recycle stream is passed in indirect contact with said higher-boiling component from said first distillation thereby heating said recycle stream and returning said recycle stream to said second distillation.

6. The method of claim 5 in which the product stream of said intermediate-boiling component is passed in indirect contact with said liquid second mixture after contact of said liquid second mixture with said lower-boiling component reflux stream.

7. In a method for separating a first mixture of a lower-boiling component, an intermediate-boiling component and a higher-boiling component wherein a first fractional distillation separates said higher-boiling component from the other components of said first mixture and wherein a liquid second mixture of said lower-boiling and intermediate-boiling components is passed to a second fractional distillation, the steps of heating said second mixture by indirect contact, first, with a reflux stream of said lower-boiling component taken overhead from the second distillation and second with a stream of said intermediate-boiling component being removed as a bottoms stream from said second distillation and passing a product stream of said lower-boiling component taken overhead from said second distillation, upstream in indirect heat exchange with said first mixture prior to said first distillation.

8. The method of claim 1 wherein said first mixture is obtained by contacting a liquid-vaporous mixture of said lower-boiling component and said intermediate-boiling component with said higher-boiling component to recover said lower-boiling component vapors.

9. In a method for recovering a lower-boiling component admixed in a first mixture with an intermediate-boiling component in both vapor and liquid form, the steps comprising:

contacting said first mixture with a higher-boiling absorbent component in an absorption contactor vessel, recovering a liquid mixture of lower-boiling component and intermediate-boiling component, absorbing an drecovering in said absorbent during said contacting intermediate-boiling component vapors and lower-boiling component vapors from said mixture, removing from said contactor vessel, a second mixture of said absorbent, absorbed intermediate-boiling component, and absorbed lower-boiling component, separating said absorbed intermediate-boiling component and lower-boiling component as vapors from said absorbent by fractional distillation, passing a third mixture comprising said separated intermediate-boiling component vapors and lower-boiling component vapors together with said recovered liquid mixture of intermediate-boiling component and lower-boiling component into a second fractional distillation, dividing a vapor stream of said lower-boiling component taken overhead from said second distillation into a reflux stream and a products stream, passing said reflux stream in indirect contact with said liquid third mixture to heat said mixture prior to passing said mixture into said second distillation, and passing said products stream in indirect contact with said second mixture removed from said contactor to heat said second mixture.

10. The method of claim 9 in which a stream of said intermediate-boiling component taken as a bottoms stream from said second distillation is also divided into the recycle stream and a products stream and said recycle stream is passed in indirect contact with said higher-boiling absorbent component in said absorbent separation means thereby heating said recycle stream, returning said recycle stream to said second distillation, and passing said products stream of said intermediate-boiling component in indirect contact with said third mixture after contact of said third liquid mixture with said lower-boiling component reflux stream.

11. In a method for separating a first mixture of methanol, water, and glycol from a glycol contactor wherein a first fractional distillation separates said glycol from said mixture and wherein a second mixture of liquid methanol and water from said contactor is passed with a methanol and water mixture separated from said glycol in said first distillation, to a second fractional distillation, the steps of dividing a stream of water taken as a bottom stream from said second distillation into a recycle stream and a product stream, heating said second mixture by indirect contact first with a reflux stream of methanol taken overhead from said second distillation and second said water product stream, and passing said water recycle stream in indirect contact with said glycol separated from said first mixture in said first fractionation thereby heating said recycle stream prior to return to said second fractionation.

References Cited

UNITED STATES PATENTS

| | | | |
|---|---|---|---|
| 2,471,602 | 5/1949 | Arnold | 203—21 |
| 2,509,044 | 5/1950 | Patterson | 62—31 |
| 2,509,136 | 5/1950 | Cornell | 202—160 |
| 2,954,341 | 9/1960 | Stiles | 203—21 |
| 2,973,628 | 3/1961 | Green et al. | 62—31 |
| 3,073,752 | 1/1963 | Mention | 203—22 |
| 3,230,155 | 1/1966 | Schurch | 203—26 |
| 3,230,156 | 1/1966 | Katzen | 202—154 |
| 3,265,590 | 8/1966 | Radcay | 203—21 |
| 3,294,650 | 12/1966 | Manteufel | 203—22 |

WILBUR L. BASCOMB, JR., *Primary Examiner.*

UNITED STATES PATENT OFFICE
CERTIFICATE OF CORRECTION

Patent No. 3,388,046                            June 11, 1968

Lloyd T. Hendrix

It is certified that error appears in the above identified patent and that said Letters Patent are hereby corrected as shown below:

Column 1, line 56, "completely" should read -- complete --. Column 3, line 4, "exchanges" should read -- exchangers --; line 46, "line 28" should read -- line 20 --. Column 4, line 59, "an drecovering" should read -- and recovering --. Column 6, line 7, before "said", first occurrence, insert -- with --.

Signed and sealed this 2nd day of December 1969.

(SEAL)
Attest:

Edward M. Fletcher, Jr.                      WILLIAM E. SCHUYLER, JR
Attesting Officer                               Commissioner of Patents